(No Model.)

A. B. BARKMAN.
LUGGAGE CARRIER FOR BICYCLES.

No. 468,757. Patented Feb. 9, 1892.

Witnesses
Harry S. Rohrer
E. H. Berry

Inventor
Albert B. Barkman
By Miller & Breece,
Attorneys

United States Patent Office.

ALBERT B. BARKMAN, OF BROOKLYN, NEW YORK.

LUGGAGE-CARRIER FOR BICYCLES.

SPECIFICATION forming part of Letters Patent No. 468,757, dated February 9, 1892.

Application filed May 26, 1891. Serial No. 394,182. (No model.)

*To all whom it may concern:*

Be it known that I, ALBERT B. BARKMAN, a citizen of the United States, residing at Brooklyn, in the county of Kings and State of New York, have invented certain new and useful Improvements in Luggage-Carriers; and I do hereby declare the following to be a full, clear, and exact description of the invention, such as will enable others skilled in the art to which it appertains to make and use the same.

The object of this invention is to provide a luggage-carrier having advantages not found, so far as I am aware, in those heretofore in use. It is common among riders to remove the saddle to a place of safety when the cycle is not in use, leaving the machine also comparatively secure because not in condition to be mounted. This carrier is combined with the saddle, so that when the latter is removed the carrier accompanies it. The carrier is particularly adapted for use with ladies' cycles, as it places the luggage where it is not conspicuous, and does not in the least interfere with the mount. It is fully shown in the accompanying drawings, in which—

Figure 2:
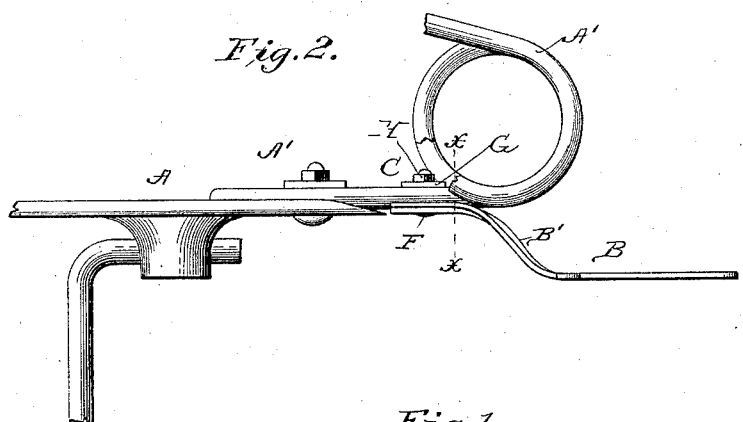
Figure 1:
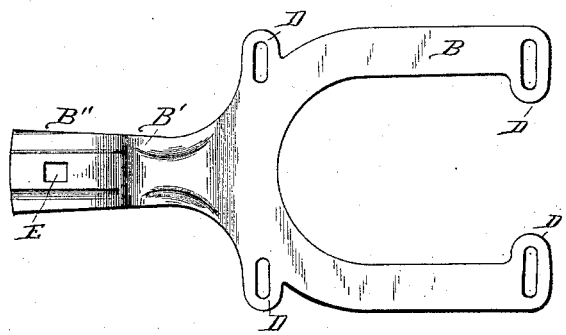
Figure 3:
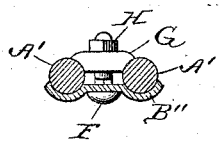

Figure 1 is a plan view of the carrier proper. Fig. 2 is a side elevation of a saddle with the carrier in position. Fig. 3 is a section on the line $x$ $x$, Fig. 2.

In the figures, A is a saddle of ordinary form, having rear springs A'; B, the body of a carrier having a shank B', and C a clip by which the shank is secured to the springs A'. The body of the carrier is without novelty, being a plane fork of horseshoe-like form having eyes D for the passage of straps for securing luggage laid directly upon the fork. The shank passes rearward and upward with a double or reversed curve, and terminates in an end portion B'' parallel to the fork, but in a higher plane. This end portion is corrugated, forming two grooves to fit the branches of the spring, and is provided with an aperture E for a bolt F, which passes upward between the branches, and through a saddle-plate G resting upon them. A nut H is screwed upon the upper end of the bolt and against the plate, binding all the parts firmly together. The grooves give greater bearing-surface and prevent the lateral displacement of the carrier by rotation upon the bolt. The main portion of the shank is made curved in cross-section to increase its rigidity. It is not essential that the shank be in all cases secured to the spring, as distinguished from the part to which the spring is attached; but such attachment is preferable. The downward curvature of the shank as it passes away from the saddle is of great importance, because otherwise a bundle of considerable size would render the rear mount difficult. With the package well down upon the wheel and very close to the saddle this is avoided, and at the same time the center of gravity is lowered and the bundle brought near the rider, where it is much less noticeable than when placed upon the front of the machine or vertically above the rear axle.

What I claim is—

1. The combination, with the rear saddle-spring, of the carrier having the downwardly-curved shank secured thereto, substantially as set forth.

2. The combination, with the rear saddle-spring, of the downwardly-curved carrier having the corrugated shank and the bolt and saddle-plate securing the shank to said spring, substantially as set forth.

In testimony whereof I affix my signature in presence of two witnesses.

ALBERT B. BARKMAN.

Witnesses:
EDW. D. LOANE, Jr.,
E. F. QUINBY.